US011531002B2

(12) United States Patent
Matsuyama et al.

(10) Patent No.: US 11,531,002 B2
(45) Date of Patent: Dec. 20, 2022

(54) GAS SENSOR

(71) Applicant: NGK SPARK PLUG CO., LTD., Nagoya (JP)

(72) Inventors: Daisuke Matsuyama, Nagoya (JP); Masahiro Asai, Nagoya (JP); Masashi Nomura, Nagoya (JP); Yuto Inose, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 362 days.

(21) Appl. No.: 16/804,283

(22) Filed: Feb. 28, 2020

(65) Prior Publication Data

US 2020/0292485 A1    Sep. 17, 2020

(30) Foreign Application Priority Data

Mar. 15, 2019   (JP) .............................. JP2019-048040

(51) Int. Cl.
*G01N 27/409*   (2006.01)
*G01N 27/407*   (2006.01)
(Continued)

(52) U.S. Cl.
CPC ......... *G01N 27/409* (2013.01); *F01N 13/008* (2013.01); *G01N 25/005* (2013.01);
(Continued)

(58) Field of Classification Search
CPC .............. G01N 27/409; G01N 25/005; G01N 27/4077; G01N 27/4078; F01N 13/008;
(Continued)

(56) References Cited

U.S. PATENT DOCUMENTS 4,668,477 A * 5/1987 Nishio ............... G01N 27/4077
                                                        73/31.05
5,689,059 A * 11/1997 Oh ..................... G01N 33/0016
                                                        73/23.31
(Continued)

FOREIGN PATENT DOCUMENTS

JP    2012-154774 A    8/2012
JP    2016-095223 A    5/2016
JP    2017-44522 A     3/2017

*Primary Examiner* — Randy W Gibson
*Assistant Examiner* — John M Royston
(74) *Attorney, Agent, or Firm* — Sughrue Mion, PLLC

(57) ABSTRACT

A gas sensor (100) extending in an axial direction AX including: a gas sensor element (120) which detects the concentration of a specific gas in a gas under measurement; a tubular metallic shell (110) having a polygonal tool engagement portion (110B) surrounding the gas sensor element (120); a tubular outer tube (103) which extends rearward from the metallic shell (110), surrounds the gas sensor element (120), and has an opening (103E) at a rear end thereof; a sealing member (191) which seals the opening (103E); and a tubular heat dissipating member (104) which surrounds the outer tube (103) and reduces the amount of heat transferred from the forward end side of the gas sensor (100) through the outer tube (103) to the sealing member (191). The maximum diameter D1 of the heat dissipating member (104) is equal to or less than the opposite side dimension D2 of the tool engagement portion (110B).

6 Claims, 2 Drawing Sheets

(51) Int. Cl.
    *G01N 25/00*     (2006.01)
    *F01N 13/00*     (2010.01)
    *G01M 15/10*     (2006.01)
    *F01N 11/00*     (2006.01)

(52) U.S. Cl.
    CPC ..... G01N 27/4077 (2013.01); G01N 27/4078 (2013.01); *F01N 11/007* (2013.01); *F01N 2260/02* (2013.01); *F01N 2560/02* (2013.01); *G01M 15/104* (2013.01)

(58) Field of Classification Search
    CPC ............ F01N 2260/02; F01N 2560/02; F01N 11/007; G01M 15/104; G01M 15/02
    See application file for complete search history.

(56) References Cited

U.S. PATENT DOCUMENTS

| | | | |
|---|---|---|---|
| 6,418,779 B1 * | 7/2002 | Huang | ............... G01N 27/4077 73/23.31 |
| 2017/0059540 A1 | 3/2017 | Watanabe et al. | |

* cited by examiner

GAS SENSOR

BACKGROUND OF THE DISCLOSURE

1. Field of the Disclosure

The present disclosure relates to a gas sensor.

2. Description of the Related Art

Japanese Patent Application Laid-Open (kokai) No. 2016-95223 (Patent Document 1) discloses a known gas sensor for detecting the concentration of a specific component (such as oxygen or NOx) in exhaust gas from an internal combustion engine. This gas sensor includes a gas sensor element extending in the direction of an axial line, a metallic shell which radially surrounds the gas sensor element to hold the gas sensor element, and a grommet disposed inside a rear end portion of an outer tube and in contact with the outer tube. Since a tubular protecting member is attached to the outer circumference of the outer tube, the outer tube can be protected from flying stones, etc., which would otherwise strike the outer tube.

The protecting member includes a connection portion connected to the outer circumference of the outer tube, for example, by laser welding, and a main portion extending rearward from the connection portion and spaced apart from the outer circumference of the outer tube. Heat transferred from the outer tube of the gas sensor to the connection portion is dissipated from the connection portion to the main portion, so that the amount of heat transferred from the outer tube to the grommet can be reduced to thereby prevent thermal degradation of the grommet.

[Patent Document 1] Japanese Patent Application Laid-Open (kokai) No. 2016-95223

3. Problems to be Solved by the Disclosure

In the above gas sensor, since the maximum diameter of the heat dissipating member is larger than the opposite side dimension of a tool engagement portion, which is the distance between two opposite sides thereof, the gas sensor has an increased overall size. This has a large influence on the layout of other components of the internal combustion engine and on the ease of attachment of the gas sensor.

SUMMARY OF THE DISCLOSURE

The above problem has been solved by providing (1) a gas sensor extending in an axial direction and comprising: a gas sensor element which detects the concentration of a specific gas in a gas under measurement; a tubular metallic shell having a polygonal tool engagement portion surrounding the gas sensor element; a tubular outer tube which extends rearward from the metallic shell, surrounds the gas sensor element, and has an opening at a rear end thereof; a sealing member which seals the opening; and a tubular heat dissipating member which surrounds the outer tube and reduces the amount of heat transferred from a forward end side of the gas sensor through the outer tube to the sealing member, wherein a maximum diameter of the heat dissipating member is equal to or less than an opposite side dimension of the tool engagement portion, which is a distance between two opposite sides of the tool engagement portion.

In this structure, the maximum diameter of the heat dissipating member is equal to or less than the opposite side dimension of the tool engagement portion, which is the distance between two opposite sides of the tool engagement portion. Therefore, the overall size of the gas sensor can be reduced, and the influence on the layout of other components of an internal combustion engine and on the ease of attachment of the gas sensor is small. Since the heat from the forward end of the gas sensor can be dissipated to the outside through the heat dissipating member, heat transfer to an upper portion of the gas sensor can be reduced. Therefore, this configuration prevents the upper portion of the gas sensor from being influenced by the heat, and prevents the sealing member, for example, from being influenced by the heat.

In a preferred embodiment (2) of the gas sensor (1) above, a rear end of the heat dissipating member is located forward of a forward end of the sealing member or the heat dissipating member at least partially overlaps the sealing member in the axial direction and is spaced apart from the outer tube in at least part of a region in which the heat dissipating member overlaps the sealing member.

In another preferred embodiment (3) of the gas sensor (1) or (2) above, the outer tube has a heat transfer resistance per unit length in the axial direction that is larger than that of the heat dissipating member.

In yet another preferred embodiment (4) of the gas sensor of any of (1) to (3) above, the heat dissipating member has a thickness that is larger than the thickness of the outer tube.

In these embodiments, the amount of heat transferred from the metallic shell to the heat dissipating member can be larger than the amount of heat transferred from the metallic shell to the outer tube.

In yet another preferred embodiment (5) of the gas sensor of any of (1) to (4) above, the metallic shell has a mounting portion extending rearward from a rear end of the tool engagement portion, and the heat dissipating member is fixed to the mounting portion directly or indirectly through the outer tube while overlapping the mounting portion in the axial direction.

In the above embodiment, the heat dissipating member is fixed to the mounting portion of the metallic shell, which portion is close to the heat source, without interfering with the tool engagement portion, so that the heat can be dissipated more efficiently.

In yet another preferred embodiment (6) of the gas sensor (5) above, a forward end of the heat dissipating member, a forward end of the outer tube, and the mounting portion are integrally fixed by welding.

In the above embodiment, the mounting portion, the forward end portion of the heat dissipating member, and the forward end portion of the outer tube are in contact with each other, so that the heat can be easily dissipated from the mounting portion to the heat dissipating member.

Effects of the Disclosure

The gas sensor configured as disclosed in the present specification can have a reduced overall size.

DESCRIPTION OF REFERENCE NUMERALS

Figure 1:
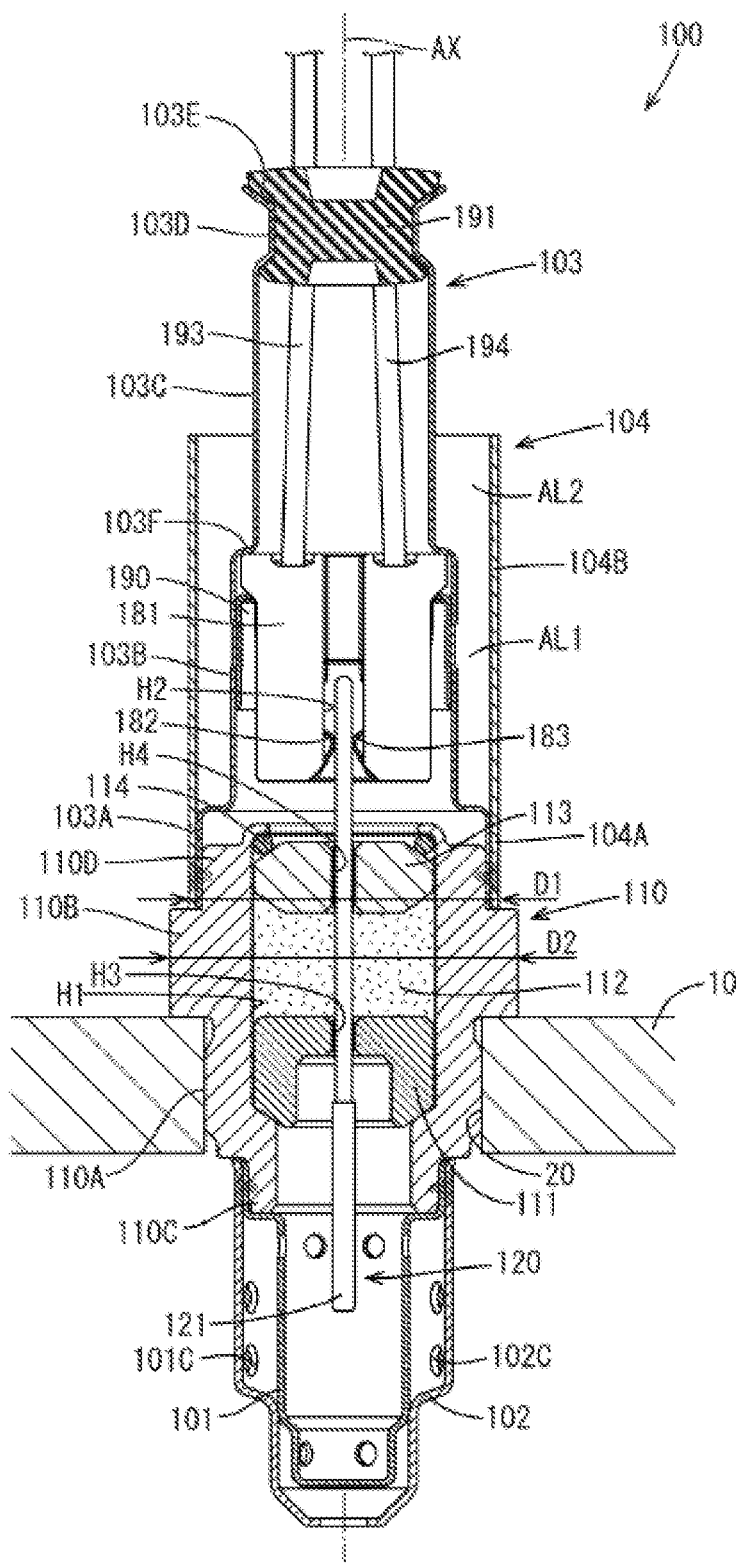
FIG. 1 is a cross-sectional view showing an internal structure of a gas sensor according to a first embodiment 1.

Reference numerals used to identify various features in the drawings include the following.

10: exhaust pipe
20: thread groove
100, 200: gas sensor
101: inner protector
101C: introduction hole
102: outer protector
102C: introduction hole
103: outer tube
103A: connection portion
103B: separator-housing portion
103C: lead wire-housing portion
103D: sealing member-holding portion
103E: opening
103F: step portion
104, 204: heat dissipating member
104A, 204A: connection portion
104B, 204B: main portion
204C: heat radiation hole
204D: rear opening
110: metallic shell
110A: threaded portion
110B: tool engagement portion
110C: protector connection portion
110D: mounting portion
111: ceramic holder
112: powder filled layer
113: ceramic sleeve
114: crimp ring
120: gas sensor element
121: gas detection portion
181: separator
182: connection terminal (for sensor)
183: connection terminal (for heater)
190: urging metal member
191: sealing member
193: sensor lead wire
194: heater lead wire
AL1: first air layer
AL2: second air layer
AL3: third air layer
AX: axial line
D1: maximum diameter (of heat dissipating member)
D2: opposite side dimension (between two opposite sides of tool engagement portion)
H1: through hole (of metallic shell)
H2: through hole (of separator)
H3: through hole (of ceramic holder)
H4: through hole (of ceramic sleeve)

DETAILED DESCRIPTION OF THE PREFERRED EMBODIMENTS

The gas sensor of the present disclosure is described in greater detail below with reference to the drawings. However, the present disclosure should not be construed as being limited thereto.

Embodiment 1

Embodiment 1 will be described with reference to FIG. 1.
(Structure of Gas Sensor)
A gas sensor 100 is an oxygen sensor that is to be attached to an exhaust pipe 10 of an internal combustion engine. The gas sensor 100 is a so-called full range air-fuel ratio sensor which detects the concentration of oxygen in exhaust gas (gas to be measured) linearly over a range from a rich region to a lean region.

An axial line AX in FIG. 1 is a virtual central axis of the gas sensor 100. The gas sensor 100 has a shape extending in the direction of the axial line AX. The gas sensor 100 includes a gas sensor element 120, a metallic shell 110, an outer tube 103, and a heat dissipating member 104. The gas sensor element 120 outputs a signal corresponding to the concentration of oxygen.
(Structure of Metallic Shell)
The metallic shell 110 is a tubular metallic member having a through hole H1 extending in the direction of the axial line AX. The metallic shell 110 is disposed radially outward of the gas sensor element 120 so as to surround the gas sensor element 120. The metallic shell 110 holds the gas sensor element 120 and fixedly attaches the gas sensor 100 to the exhaust pipe 10.

The metallic shell 110 includes a threaded portion 110A, a tool engagement portion 110B disposed rearward (upward in the drawing sheet) of the threaded portion 110A, a protector connection portion 110C disposed forward (downward in the drawing sheet) of the threaded portion 110A, and a mounting portion 110D disposed rearward of the tool engagement portion 110B. The exhaust pipe 10 has a thread groove 20 for attachment of the gas sensor 100. By fastening the threaded portion 110A to the thread groove 20 of the exhaust pipe 10, the gas sensor 100 is fixed to the exhaust pipe 10.

The tool engagement portion 110B has a regular hexagonal outer shape as viewed from the rear end side of the gas sensor 100. To attach the gas sensor 100 to a vehicle, a tool (not shown) such as a spanner or a socket wrench is engaged with the tool engagement portion 110B. By rotationally moving the tool engaged with the tool engagement portion 110B, the threaded portion 110A is fastened to the thread groove 20.
(Structure of Protector)
A pair of protectors 101 and 102 are fixed integrally to the protector connection portion 110C of the metallic shell 110 by laser welding (the welded portions are shaded with dots). Each of the pair of protectors 101 and 102 has a closed-end tubular shape and opens rearward. The pair of protectors 101 and 102 includes an inner protector 101 and an outer protector 102. The inner protector 101 and the outer protector 102 have a plurality of introduction holes 101C and a plurality of introduction holes 102C, respectively. The plurality of introduction holes 101C are provided in a circumferential wall portion of the inner protector 101, and the plurality of introduction holes 102C are provided in a circumferential wall portion of the outer protector 102.

In a state in which the gas sensor 100 is attached to the exhaust pipe 10 of the vehicle, the exhaust gas in the exhaust pipe 10 is introduced into a space inside the outer protector 102 through the introduction holes 102C of the outer protector 102. The exhaust gas introduced into the space inside the outer protector 102 is introduced into a space inside the inner protector 101 through the introduction holes 101C of the inner protector 101.
(Structure of Outer Tube)
The outer tube 103 includes, sequentially from the forward end side, a connection portion 103A, a separator-housing portion 103B, a lead wire-housing portion 103C, and a sealing member-holding portion 103D. The outer tube 103 is made of metal and is formed of SUS304 in the present embodiment. The outer tube 103 has a tubular overall shape. The connection portion 103A has a larger diameter than the separator-housing portion 103B, and the separator-housing portion 103B has a larger diameter than the lead wire-housing portion 103C. The lead wire-housing portion 103C has a larger diameter than the sealing member-holding portion 103D. The separator-housing portion 103B is connected to the lead wire-housing portion 103C through a step portion 103F. The inner circumferential surface of the connection portion 103A is in contact with the outer circumferential surface of the mounting portion 110D of the metallic shell 110. The connection portion 103A is fixed to the mounting portion 110D by laser welding (the welded portions are shaded with dots).

An opening 103E is formed at the rear end of the sealing member-holding portion 103D of the outer tube 103. The opening 103E is inclined such that its diameter increases toward the rear end. Three sensor lead wires 193 and two heater lead wires 194 are introduced through the opening 103E into the outer tube 103. The lead wires 193 and 194 play a role in electrically connecting the gas sensor 100 to an external control circuit.

A sealing member 191 such as a grommet is attached to the sealing member-holding portion 103D of the outer tube 103. The sealing member 191 is formed of rubber such as silicone rubber or fluorocarbon rubber and is formed of fluorocarbon rubber in the present embodiment. The opening 103E of the outer tube 103 is closed by the sealing member 191, whereby the interior space of the outer tube 103 is sealed. The lead wires 193 and 194 pass through the sealing member 191 and are introduced into the separator-housing portion 103B through the lead wire-housing portion 103C of the outer tube 103.

(Structure of Gas Sensor Element)

The gas sensor element 120 has a layered structure including elongated plate members stacked together. The gas sensor element 120 has a quadrangular prism shape whose cross section perpendicular to the axial line AX has an approximately rectangular shape. The gas sensor element 120 is fixed to the metallic shell 110 at the position of the through hole H1 of the metallic shell 110. The gas sensor element 120 is housed in the gas sensor 100 so as to extend in the direction of the axial line AX. The gas sensor element 120 is disposed coaxially with the tool engagement portion 110B of the metallic shell 110. The tool engagement portion 110B is disposed so as to surround the gas sensor element 120.

A gas detection portion 121 is provided at the forward end of the gas sensor element 120. The gas detection portion 121 is configured so as to be capable of detecting the concentration of oxygen in the exhaust gas. The gas detection portion 121 is disposed inside the inner protector 101. In a state in which the gas sensor 100 is attached to the exhaust pipe 10 of a vehicle, the gas detection portion 121 is exposed to the exhaust gas introduced into the space inside the inner protector 101 through the plurality of introduction holes 101C and 102C. The concentration of oxygen in the exhaust gas is thereby detected by the gas detection portion 121.

(Structure of Separator)

A separator 181 is housed in the separator-housing portion 103B of the outer tube 103. The separator 181 is a tubular insulating member having a through hole H2. The through hole H2 is formed to extend in the direction of the axial line AX. A tubular urging metal member 190 is disposed on the outer circumference of the separator 181. The separator 181 is urged toward the sealing member 191 by the urging metal member 190. As a result, the separator 181 is pressed against the step portion 103F of the outer tube 103 and held by the separator-housing portion 103B. A rear end portion of the gas sensor element 120 is housed in the through hole H2 of the separator 181.

Three sensor electrode pads (not shown) and two heater electrode pads (not shown) are disposed on the rear end portion of the gas sensor element 120. Three sensor connection terminals 182 and two heater connection terminals 183 are housed in the separator 181. The connection terminals 182 and 183 each have a flat spring bent from the forward end side of the gas sensor 100 toward the rear end side. The elastic forces of the flat springs bring the connection terminals 182 and 183 into elastic contact with the respective electrode pads. The connection terminals 182 and 183 are electrically connected to the respective lead wires 193 and 194.

(Structure for Fixing Gas Sensor Element)

The gas sensor element 120 is fixed to the metallic shell 110 in the following manner. A ceramic holder 111, a powder filled layer 112, and a ceramic sleeve 113 are stacked in the through hole H1 of the metallic shell 110 in this order from the forward end side to the rear end side.

The ceramic holder 111 is formed of alumina ($Al_2O_3$). A crimp ring 114 is disposed between the ceramic sleeve 113 and the rear end of the metallic shell 110. A rectangular through hole H3 is formed at the center of the ceramic holder 111. The through hole H3 of the ceramic holder 111 extends in the direction of the axial line AX. The gas sensor element 120 is inserted into the through hole H3 of the ceramic holder 111.

The powder filled layer 112 is formed by filling talc powder above the ceramic holder 111. The ceramic sleeve 113 is disposed on the powder filled layer 112. A rectangular through hole H4 is formed at the center of the ceramic sleeve 113. The gas sensor element 120 is inserted into the through hole H4 of the ceramic sleeve 113. The ceramic sleeve 113 is formed of alumina. A rear end portion of the metallic shell 110 is bent and crimped radially inward, and the ceramic sleeve 113 is thereby pressed toward the powder filled layer 112 through the crimp ring 114. In this manner, the gas sensor element 120 integrated with the ceramic holder 111, the powder filled layer 112, and the ceramic sleeve 113 is fixed to the metallic shell 110.

(Structure of Heat Dissipating Member)

The heat dissipating member 104 includes a connection portion 104A and a main portion 104B. The heat dissipating member 104 has a tubular shape surrounding the outer tube 103. The maximum diameter D1 of the heat dissipating member 104 is equal to or less than the opposite side dimension D2 of the tool engagement portion 110B, which is the distance between two opposite sides of the tool engagement portion 110B. Generally, the tool engagement portion 110B has a regular hexagonal outer shape including six sides in plan view, and the opposite side dimension D2 is the separation distance between two parallel sides among the six sides. The heat dissipating member 104 is made of metal. In the present embodiment, the heat dissipating member 104 is formed of SUS304, which is the same material as that of the outer tube 103.

The heat dissipating member 104 has a larger thickness and a larger outer diameter than the outer tube 103. Therefore, the cross sectional area of the outer tube 103 is smaller than the cross sectional area of the heat dissipating member 104. Thus, the heat transfer resistance per unit length of the outer tube 103 in the direction of the axial line AX of the gas sensor 100 is larger than the heat transfer resistance per unit length of the heat dissipating member 104. In this configuration, the amount of heat transfer from the forward end side of the gas sensor 100 to the heat dissipating member 104 is larger than the amount of heat transfer to the outer tube 103, and the heat transferred to the heat dissipating member 104 is dissipated to the outside.

The heat dissipating member 104 is disposed coaxially with the tool engagement portion 110B. The outer circumferential surface of the heat dissipating member 104 is located radially inward of the tool engagement portion 110B (on the side toward the axial line AX) when viewed from the rear end side of the gas sensor 100. The inner circumferential surface of the heat dissipating member 104 is located radially outward of the mounting portion 110D when viewed from the rear end side of the gas sensor 100.

The connection portion 104A is disposed on the forward end side of the main portion 104B and is continuous therewith. The connection portion 104A and the main portion 104B have the same maximum diameter D1. The inner circumferential surface of the connection portion 104A is in contact with the outer circumferential surface of the connection portion 103A of the outer tube 103. The connection portion 104A is integrally fixed by laser welding to the mounting portion 110D of the metallic shell 110 through the connection portion 103A of the outer tube 103 (the welded portions are shaded with dots).

The rear end of the main portion 104B is located forward of the forward end of the sealing member 191. The rear end of the main portion 104B is located rearward of the rear end of the separator-housing portion 103B. The rear end of the main portion 104B is located near the center, with respect to the direction of the axial line AX, of the lead wire-housing portion 103C.

A first air layer AL1 is formed between the inner circumferential surface of the main portion 104B and the outer circumferential surface of the separator-housing portion 103B of the outer tube 103. A second air layer AL2 is formed between the inner circumferential surface of the main portion 104B and the outer circumferential surface of the lead wire-housing portion 103C of the outer tube 103. The first air layer AL1 and the second air layer AL2 are in communication with each other. The second air layer AL2 is in communication with the outside. The size of the first air layer AL1 in the radial direction is smaller than the size of the second air layer AL2 in the radial direction. The size of the first air layer AL1 in the direction of the axial line AX is larger than the size of the second air layer AL2 in the direction of the axial line AX.

Part of the main portion 104B overlaps the entire separator-housing portion 103B in the direction of the axial line AX at the position of the first air layer AL1. Part of the main portion 104B overlaps a forward end portion of the lead wire-housing portion 103C in the direction of the axial line AX at the position of the second air layer AL2.

(Action of Heat Dissipating Member)

The protective action of the heat dissipating member 104 is as follows. The heat dissipating member 104 in the present embodiment is smaller than conventional heat dissipating members and is located within a radially extending region corresponding to the tool engagement portion 110B. Therefore, to attach the gas sensor 100 to an exhaust pipe 10 of a vehicle, a conventionally used tool (such as a socket wrench) can be used. Since the connection portion 104A of the heat dissipating member 104 is connected to the connection portion 103A of the outer tube 103, the main portion 104B covers the separator-housing portion 103B, and the separator-housing portion 103B is thereby protected by the main portion 104B. This configuration prevents the urging metal member 190 disposed inside the separator-housing portion 103B from impact. In turn, this prevents a shift due to such impact in the separator 181 held by the urging metal member 190 and in the connection terminals 182 and 183 attached to the separator 181 which could otherwise result in breakage of electrical connections between the electrode pads and the connection terminals 182 and 183.

The main portion 104B need not completely cover the separator-housing portion 103B in the direction of the axial line AX. It is only necessary for the main portion 104B to cover at least part of the separator-housing portion 103B including its forward end. Moreover, the entirety of the sealing member-holding portion 103D need not be covered with the main portion 104B.

The heat dissipation action of the heat dissipating member 104 is as follows. The heat of the gas sensor 100 transfers from the connection portion 103A of the outer tube 103 to both the separator-housing portion 103B and the connection portion 104A of the heat dissipating member 104. However, the heat transfer resistance of the separator-housing portion 103B is larger than the heat transfer resistance of the connection portion 104A of the heat dissipating member 104. Therefore, the heat from the forward end side of the gas sensor 100 transfers from the connection portion 103A of the outer tube 103 through the connection portion 104A of the heat dissipating member 104 to the main portion 104B and is then dissipated to the outside from the main portion 104B. Thus, the amount of heat transferred to the sealing member-holding portion 103D is reduced, so that thermal degradation of the sealing member 191 is suppressed.

As the heat capacity of the heat dissipating member increases, the heat dissipation performance of the heat dissipating member increases. Therefore, one might contemplate forming the heat dissipating member so as to have a length sufficient to cover the entire sealing member-holding portion 103D. However, when the entire sealing member-holding portion 103D is covered with the heat dissipating member, heat tends to accumulate around the sealing member-holding portion 103D, and the sealing member 191 is likely to thermally degrade. Therefore, in the present embodiment, the heat dissipating member 104 is formed to have a short length such that the sealing member-holding portion 103D is exposed to the outside, and the heat dissipating member 104 is formed to have a larger thickness than the outer tube 103 to increase the heat capacity of the heat dissipating member 104. Therefore, heat does not accumulate around the sealing member-holding portion 103D, and the heat dissipation performance of the heat dissipating member 104 itself is high. Since the heat dissipating member 104 is spaced apart from the sealing member-holding portion 103D, heat transfer from the heat dissipating member 104 to the sealing member-holding portion 103D is reduced, and thermal degradation of the sealing member 191 is suppressed.

Effects of the Present Embodiment

As described above, the gas sensor 100 of the present embodiment extends in the direction of the axial line AX and includes (1) the gas sensor element 120 which detects the concentration of a specific gas in a gas under measurement, (2) the tubular metallic shell 110 which has the polygonal tool engagement portion 110B surrounding the gas sensor element 120, (3) the tubular outer tube 103 which extends rearward from the metallic shell 110, surrounds the gas sensor element 120, and has the opening 103E at the rear end, (4) the sealing member 191 which seals the opening 103E, and (5) the heat dissipating member 104 which has a tubular shape surrounding the outer tube 103 and reduces the amount of heat transferred from the forward end side of the gas sensor 100 through the outer tube 103 to the sealing member 191. The maximum diameter D1 of the heat dissipating member 104 is equal to or less than the opposite side dimension D2 of the tool engagement portion 110B, which is the distance between two opposite sides of the tool engagement portion 110B.

In this structure, since the maximum diameter D1 of the heat dissipating member 104 is equal to or less than the opposite side dimension D2 of the tool engagement portion 110B, which is the distance between two opposite sides of the tool engagement portion 110B, the overall size of the gas sensor 100 can be reduced. Further, the influence on the layout of other components of the internal combustion engine and on the ease of attachment of the gas sensor 100 is small. Since the heat from the forward end of the gas sensor 100 can be dissipated to the outside through the heat dissipating member 104, the heat transfer to the upper portion of the gas sensor 100 can be reduced. Therefore, the upper portion of the gas sensor 100 is prevented from being influenced by heat. For example, influence of heat on the sealing member 191 can be prevented.

The heat dissipating member 104 may be configured such that the rear end of the heat dissipating member 104 is disposed forward of the forward end of the sealing member 191.

The heat dissipating member 104 may be configured such that, when the heat dissipating member 104 and the he outer tube 103 are compared with each other in terms of heat transfer resistance per unit length of in the direction of the axial line AX, the outer tube 103 has a larger heat transfer resistance per unit length.

The heat dissipating member 104 may be configured such that the thickness of the heat dissipating member 104 is larger than the thickness of the outer tube 103.

In this case, the amount of heat transferred from the metallic shell 110 to the heat dissipating member 104 can be made larger than the amount of heat transferred from the metallic shell 110 to the outer tube 103.

The metallic shell 110 may include the mounting portion 110D extending rearward from the rear end of the tool engagement portion 110B, and the heat dissipating member 104 may be configured such that the heat dissipating member 104 overlaps the mounting portion 110D in the direction of the axial line AX and is fixed to the mounting portion 110D directly or indirectly through the outer tube 103.

In this manner, the heat dissipating member 104 can be fixed to the mounting portion 110D of the metallic shell 110, which is a portion close to the heat source, without interfering with the tool engagement portion 110B, so that the heat can be more efficiently dissipated.

The forward end portion of the heat dissipating member 104, the forward end portion of the outer tube 103, and the mounting portion 110D may be fixed integrally by welding.

In this structure, the mounting portion 110D, the forward end portion of the heat dissipating member 104, and the forward end portion of the outer tube 103 are in contact with each other, so that the heat can be easily dissipated from the mounting portion 110D to the heat dissipating member 104.

Embodiment 2

Figure 2:
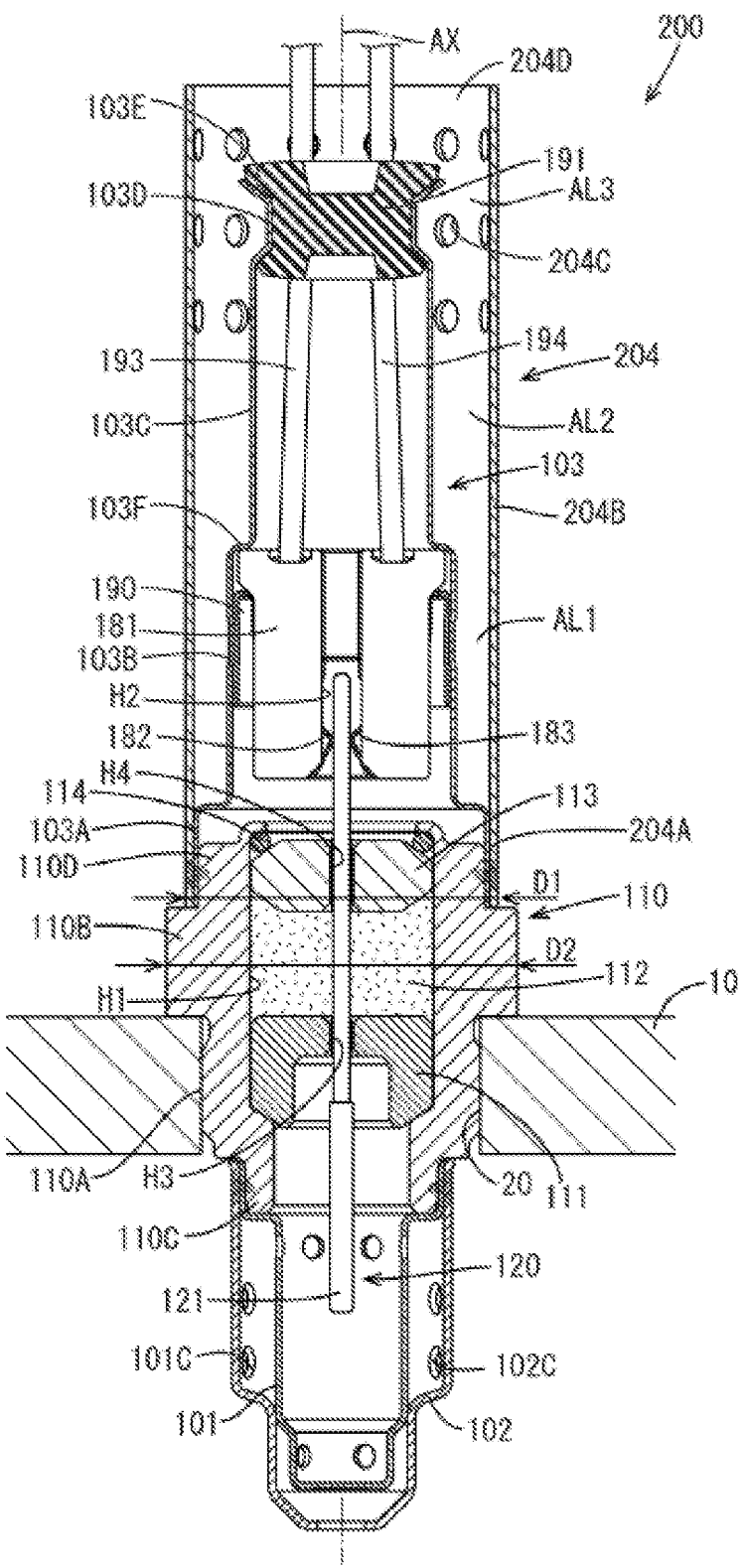
FIG. 2 is a cross-sectional view showing an internal structure of a gas sensor according to a second embodiment 2.

Next, embodiment 2 will be described with reference to FIG. 2. A gas sensor 200 of the present embodiment uses a heat dissipating member 204 which has a shape different from the shape of the heat dissipating member 104 of the gas sensor 100 of embodiment 1. Components other than the heat dissipating member 204 are the same as those in embodiment 1 and are denoted by the same numerals, and redundant description will be omitted.

The heat dissipating member 204 includes a connection portion 204A and a main portion 204B. The heat dissipating member 204 has a tubular shape surrounding the outer tube 103. The maximum diameter D1 of the heat dissipating member 204 is equal to or less than the opposite side dimension D2 of the tool engagement portion 110B, which is the distance between two opposite sides of the tool engagement portion 110B. Generally, the tool engagement portion 110B has a regular hexagonal outer shape including six sides in plan view, and the opposite side dimension D2 is the separation distance between two parallel sides among the six sides. The heat dissipating member 204 is made of metal. In the present embodiment, the heat dissipating member 204 is formed of SUS304, which is the same material as that of the outer tube 103. The heat dissipating member 204 has a larger thickness than the outer tube 103. Therefore, the heat transfer resistance of the outer tube 103 is larger than the heat transfer resistance of the heat dissipating member 204.

The heat dissipating member 204 is disposed coaxially with the tool engagement portion 110B. The outer circumferential surface of the heat dissipating member 204 is located radially inward of the tool engagement portion 110B (on the side toward the axial line AX) when viewed from the rear end side of the gas sensor 200. The inner circumferential surface of the heat dissipating member 204 is located radially outward of the mounting portion 110D when viewed from the rear end side of the gas sensor 200.

The connection portion 204A is disposed on the forward end side of the main portion 204B so as to be continuous therewith. The connection portion 204A and the main portion 204B have the same maximum diameter D1. The inner circumferential surface of the connection portion 204A is in contact with the outer circumferential surface of the connection portion 103A of the outer tube 103. The connection portion 204A is integrally fixed by laser welding to the mounting portion 110D of the metallic shell 110 through the connection portion 103A of the outer tube 103 (the welded portions are shaded with dots).

The rear end of the main portion 204B is located rearward of the rear end of the sealing member 191 (on the side opposite to the separator 181). The rear end of the main portion 204B is located rearward of the rear end of the sealing member-holding portion 103D. The rear end of the main portion 204B is disposed at a position at which the rear end surrounds the lead wires 193 and 194 extending from the sealing member 191.

The first air layer AL1 is formed between the inner circumferential surface of the main portion 204B and the outer circumferential surface of the separator-housing portion 103B of the outer tube 103. The second air layer AL2 is formed between the inner circumferential surface of the main portion 204B and the outer circumferential surface of the lead wire-housing portion 103C of the outer tube 103. A third air layer AL3 is formed between the inner circumferential surface of the main portion 204B and the outer circumferential surface of the sealing member-holding portion 103D. The first air layer AL1, the second air layer AL2, and the third air layer AL3 are in communication with each other. The third air layer AL3 is in communication with the outside. The size of the first air layer AL1 in the radial direction is smaller than the size of the second air layer AL2 in the radial direction. The size of the first air layer AL1 in the direction of the axial line AX is larger than the size of the second air layer AL2 in the direction of the axial line AX.

Part of the main portion 204B overlaps the entire separator-housing portion 103B in the direction of the axial line AX at the position of the first air layer AL1. Part of the main portion 204B overlaps the entire lead wire-housing portion 103C in the direction of the axial line AX at the position of the second air layer AL2. Part of the main portion 204B overlaps the entire sealing member-holding portion 103D in the direction of the axial line AX at the position of the third air layer AL3.

The heat dissipating member 204 and the sealing member-holding portion 103D holding the sealing member 191 overlap each other in the direction of the axial line AX. In the overlapping region, the heat dissipating member 204 and the sealing member-holding portion 103D are radially spaced apart from each other. The heat in the third air layer AL3 is dissipated to the outside from a rear opening 204D of the heat dissipating member 204.

The maximum diameter D1 of the heat dissipating member 204 is equal to or less than the opposite side dimension D2 of the tool engagement portion 110B of the metallic shell 110, which is the distance between two opposite sides of the tool engagement portion 110B. In this case, the larger the maximum diameter D1 of the heat dissipating member 204, the better. In other words, the smaller the difference between D1 and D2, the better. This is because of the following reasons. When D1 is large, the separation distance between the heat dissipating member 204 and the outer tube 103 can be large, and heat transfer to the sealing member 191 can be reduced. Alternatively, when D1 is large, the diameter of the outer tube 103 can be increased while the heat dissipating member 204 and the outer tube 103 are held spaced apart from each other, so that the design flexibility of the structures of internal components (such as the connection terminals 182 and 183 and the separator 181) can be increased.

In the main portion 204B, a plurality of heat radiation holes 204C are provided around the sealing member 191. The heat of the third air layer AL3 is dissipated to the outside not only through the rear opening 204D of the above-described heat dissipating member 204 but also through the heat radiation holes 204C. Therefore, heat is not accumulated in the third air layer AL3. Since the main portion 204B of the heat dissipating member 204 is disposed so as to surround the sealing member-holding portion 103D, the main portion 204B can protect the sealing member-holding portion 103D from flying stones, etc., which would otherwise strike the sealing member-holding portion 103D.

Other Embodiments

The technique disclosed in the present specification is not limited to the embodiments described above with reference to the drawings. For example, the following various modes are included in the technique.

(1) In embodiments 1 and 2, the heat dissipating member 104 or 204 has a thickness (cross-sectional area) larger than the thickness (cross-sectional area) of the outer tube 103 to thereby reduce the heat transfer resistance per unit length (the resistance to heat transfer) of the heat dissipating member 104 or 204. However, the heat transfer resistance of the heat dissipating member may be reduced by using, as the material of the heat dissipating member, a metal material having a higher thermal conductivity than the metal material used for the outer tube 103. In embodiments 1 and 2, the outer tube 103 and the heat dissipating member 104 or 204 are formed of SUS304. However, for example, the outer tube 103 may be formed of SUS304, and the heat dissipating member may be formed of an aluminum alloy.

(2) In embodiment 2, part of the heat dissipating member 204 overlaps the entire sealing member-holding portion 103D in the direction of the axial line AX. However, at least part of the sealing member-holding portion 103D may overlap the heat dissipating member. For example, the length of the heat dissipating member may be set such that the rear end of the heat dissipating member is located between the forward and rear ends of the sealing member 191 in the direction of the axial line AX.

(3) In embodiments 1 and 2, the heat dissipating member 104 or 204 is fixed to the mounting portion 110D of the metallic shell 110. However, a flange extending radially outward from the forward end of the heat dissipating member may be formed and fixed to the rear surface of the tool engagement portion 110B.

(4) In embodiments 1 and 2, the forward end portion of the heat dissipating member 104 or 204 is integrally fixed to the mounting portion 110D by laser welding. However, the forward end portion of the heat dissipating member 104 or 204 may be fixed by another welding method such as resistance welding.

(5) In embodiments 1 and 2, the forward end portion of the heat dissipating member 104 or 204 and the forward end portion of the outer tube 103 overlap each other and are fixed together. However, the forward end portion of the outer tube 103 may be disposed rearward of the forward end portion of the heat dissipating member 104 or 204, and the heat dissipating member 104 or 204 may be directly fixed to the mounting portion 110D of the metallic shell 110.

(6) In embodiment 2, the heat radiation holes 204C are circular holes. However, the heat radiation holes 204C need not be circular holes but may be elongated holes, rectangular holes, or slit-like holes.

(7) In embodiments 1 and 2, the heat dissipating member 104 or 204 and the outer tube 103 are not in contact with each other in a region rearward of the mounting portion 110D. However, the heat dissipating member and the outer tube may be in contact with each other in a partial circumferential region.

(8) In embodiments 1 and 2, the gas sensors 100 and 200 exemplified are full range air-fuel ratio sensors. However, the type of gas sensors 100 and 200 is not limited thereto, and the gas sensors 100 and 200 may be lambda sensors, NOx sensors, etc.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. JP 2019-048040 filed Mar. 15, 2019, incorporated herein by reference in its entirety.

What is claimed is:

1. A gas sensor extending in an axial direction and comprising:
   a gas sensor element which detects the concentration of a specific gas in a gas under measurement;
   a tubular metallic shell having a polygonal tool engagement portion surrounding the gas sensor element;
   a tubular outer tube which extends rearward from the metallic shell, surrounds the gas sensor element, and has an opening at a rear end thereof;

a sealing member which seals the opening; and a tubular heat dissipating member which surrounds the outer tube and reduces the amount of heat transferred from a forward end side of the gas sensor through the outer tube to the sealing member, wherein a maximum diameter of the heat dissipating member is equal to or less than an opposite side dimension of the tool engagement portion, which is a distance between two opposite sides of the tool engagement portion, and the outer tube is in direct contact with the metallic shell.

2. The gas sensor as claimed in claim 1, wherein a rear end of the heat dissipating member is located forward of a forward end of the sealing member or wherein the heat dissipating member at least partially overlaps the sealing member in the axial direction and is spaced apart from the outer tube in at least part of a region in which the heat dissipating member overlaps the sealing member.

3. The gas sensor as claimed in claim 1, wherein the outer tube has a heat transfer resistance per unit length in the axial direction that is larger than that of the heat dissipating member.

4. The gas sensor as claimed in claim 1, wherein the heat dissipating member has a thickness that is larger than the thickness of the outer tube.

5. A gas sensor as claimed in claim 1, wherein the metallic shell has a mounting portion extending rearward from a rear end of the tool engagement portion, and the heat dissipating member is fixed to the mounting portion directly or indirectly through the outer tube while overlapping the mounting portion in the axial direction.

6. The gas sensor as claimed in claim 5, wherein a forward end of the heat dissipating member, a forward end of the outer tube, and the mounting portion are integrally fixed by welding.

* * * * *